United States Patent [19]

Creme

[11] 4,316,343
[45] Feb. 23, 1982

[54] PRELOOPED FISHING LURE

[76] Inventor: Michael M. Creme, 1219 Big Falls Ave., Akron, Ohio 44310

[21] Appl. No.: 136,940

[22] Filed: Apr. 3, 1980

[51] Int. Cl.³ ............................................. A01K 85/00
[52] U.S. Cl. .................................. 43/42.24; 43/42.28
[58] Field of Search ................ 43/42.24, 42.26, 42.27, 43/42.13, 42.28, 42.3, 42.11

[56] References Cited

U.S. PATENT DOCUMENTS

| | | | |
|---|---|---|---|
| D. 239,281 | 3/1976 | Williams | 43/42.24 X |
| D. 239,447 | 4/1976 | Radcliff | 43/42.26 |
| 1,832,768 | 11/1931 | Davenport | 43/42.13 |
| 3,100,360 | 8/1963 | Creme | 43/42.24 X |
| 3,158,952 | 12/1964 | Creme | 43/42.24 |
| 3,253,363 | 5/1966 | Steehn | 43/42.13 |
| 3,349,513 | 10/1967 | Jeff | 43/42.24 X |
| 3,868,784 | 3/1975 | Sabol | 43/42.3 |
| 4,047,318 | 9/1977 | Mapp | 43/42.24 |
| 4,074,455 | 2/1978 | Williams | 43/42.28 |
| 4,138,792 | 2/1979 | Hill | 43/42.24 |

FOREIGN PATENT DOCUMENTS 2145083  2/1973  France ................ 43/42.24

*Primary Examiner*—Stephen G. Kunin
*Assistant Examiner*—Robert P. Olszewski
*Attorney, Agent, or Firm*—Joseph A. Edminister

[57] ABSTRACT

An artificial fishing lure of soft, pliable rubbery material having a semi-firm body and head portion and a less firm crossed-over loop tail portion. When moved through the water the resilient tail portions opens into an unstable spiral shape reversing alternately from right handed to left handed, with accompanying rocking motion of the body and head portion. Changes in the cross sectional shape and resiliency of the crossed-over loop result in different total body motions. Fishing lures having two crossed-over loop appendages with oppositely turned loops are also provided.

4 Claims, 7 Drawing Figures

U.S. Patent  Feb. 23, 1982  4,316,343
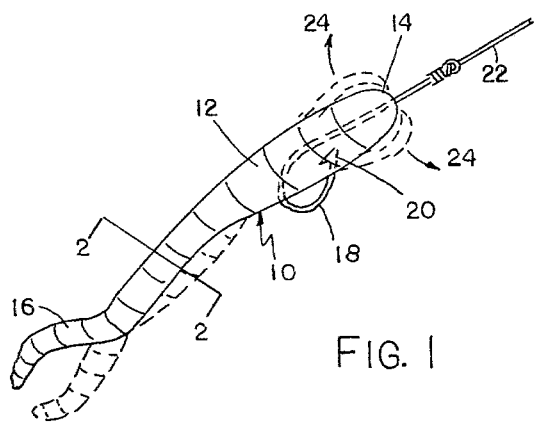
FIG. 1
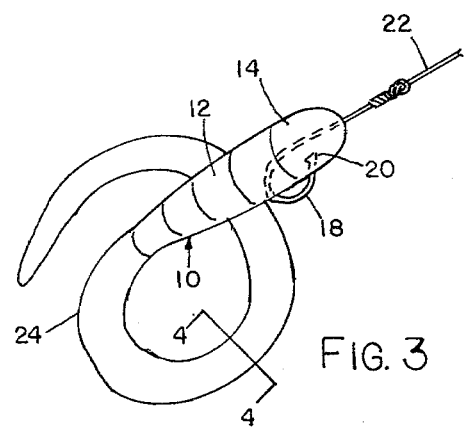
FIG. 3
SECTION 2-2
FIG. 2
SECTION 4-4
FIG. 4
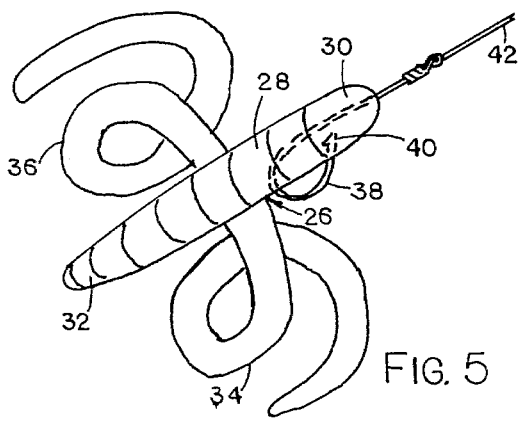
FIG. 5
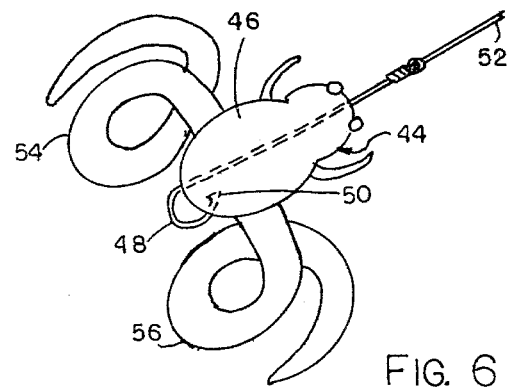
FIG. 6
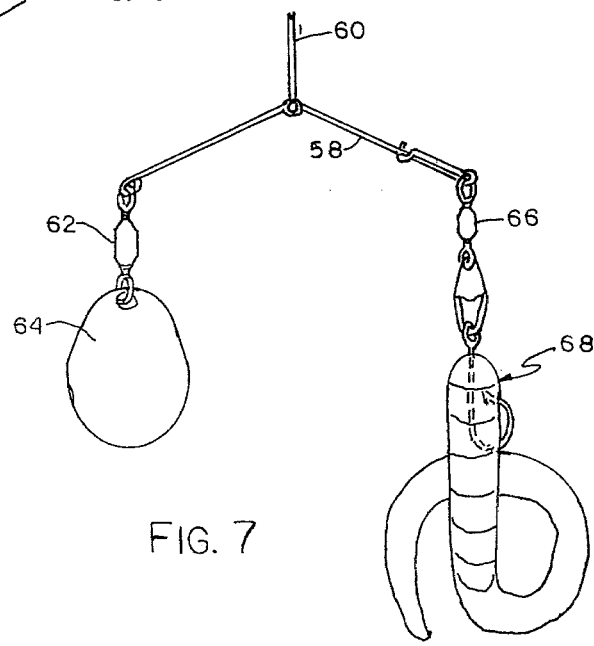
FIG. 7

PRELOOPED FISHING LURE

BACKGROUND OF THE INVENTION

The present invention relates generally to fishing lures and more specifically to soft pliable fishing lures having the appearance of worms, small water frogs and other objects which are attractive to game fish and whcih have tails or other appendages which wriggle as they move through the water. The present invention is a lure having the shape of a crossed-over loop for the body in one example and a crossed-over loop for the tail or other appendage in other applications of this invention. The crossed-over loop initiates a total body action which can include oscillating, wavering, darting, extending and retracting, reversing and balanced rocking as the fisherman works the line by either movements of the tip of the rod or by retrieving the line. The variety of actions and the corresponding lifelike motion of the lure capture the attention of game fish causing them to strike at the lure.

The prior art includes the applicant's U.S. Pat. Nos. 3,100,360 and 3,158,952, U.S. Pat. Nos. 3,983,656 issued to D. L. Bain, 3,349,513 issued to Jeff, and U.S. Pat. No. 3,037,316 issued to DeZeeuw.

The fishing lure industry has produced lures of soft plastic and other rubbery materials which simulate insects, worms and other feeding objects of game fish. While these lures have been designed to resemble the earthworm or redworm, for example, and have done so with complete detail, they have not achieved a life-like complete body action in the water attractive to game fish. The prior art discloses many lures, some with curled or coiled tails. All such lures are molded in a single layer mold. The present invention of a crossedover loop design requires either a double layer mold or an injection type mold. The looped over section of the lure can be of a thin, flat cross section or of a round or oval cross section. And, the loop can be located in the body portion of the lure or the tail section with corresponding different body motions in the water. The tail or appendage has a substantially greater motion than the firmer body and head portion, however, the rocking and darting motion of the head, caused by the moving tail portion is one of the principal improvements of this invention. The tail is a directing member, causing the body and head to dart and rock.

The present invention provides a fishing lure having a total body motion when moved through the water which includes oscillating, wavering, darting, reversing and rocking as a direct result of the loop design. The lure can be caused to turn first in one direction, then in the other in a spiral like rotating action by pulling it rapidly through the water. It can be made to extend and retract by pulling the line in a jerking type manner. The various actions described hereinabove continue at all times while the lure is in the water since even while the line is stationary the small currents present in lakes, ponds and streams impart sufficient forces to produce the said movements. The movements described result from the crossed-over loop feature and will occur with the lure on the surface, at moderate depths or near the bottom, the depth of running being set by the associated weights, swivels and leader size and length chosen by the fisherman.

The crossed-over loop section of the present invention simulates the tail portion of a worm or the legs of the common water frog. In order to simulate the frog two crossed-over loop appendages are used, one on either side of a larger, firmer main body and head portion.

A mounting apparatus is also disclosed by the present invention which includes a spoon of a size and design chosen for its movement in the water on one side of a spreader and a fishing lure of the twisting or spiraling type on the other side of the spreader. The twisting of the lure is counter-balanced by the rotating action of the spoon such that the torques produced by the spoon and the lure result in zero torque at the point of attachment of the spreader to the fishing line. In the prior art rotating lures have been offered without any means, other than the well-known swivel, to prevent the line from twisting. Since the mounting apparatus disclosed and the fishing lure in combination have zero torque at the line connection there is no twisting of the line.

SUMMARY OF THE INVENTION

The novel fishing lure of the present invention and the lure in combination with the mounting apparatus are improvements over the prior art. It is, therefore, an object of this invention to provide a fishing lure with a lifelike appearance and a life-like action in the water, principally by the crossedover loop design where the crossover can be located far back in the tail portion of the lure or far forward in the heavier body and head portion of the lure, and wherein the part of the lure making the crossover is either of a thin, flat cross-section or is substantially the same cross-section shape as the body but with a somewhat reduced size.

It is another object of this invention to provide a lure having an oscillating, wavering, darting, reversing and balanced head rocking total body action as the lure is moved through the water.

It is also an object of this invention to provide a soft, pliable fishing lure closely resembling an earthworm in appearance and motion in the water.

It is a further object of this invention to provide a soft, pliable fishing lure closely resembling a small water frog with two crossed-over loop appendages to simulate the movement of its rear legs.

It is still another object of the invention to provide a fishing lure mounting apparatus which results in zero torque at the connection point to the fishing line thereby solving a common problem which occurs with some twisting and rotating lures.

BRIEF DESCRIPTION OF THE DRAWINGS

In the drawings which are illustrative of the preferred embodiment;

FIG. 1 is a view of the lure as it appears in the water, resembling an earthworm and wherein the crossed-over loop is circular in cross-section.

FIG. 2 is section 2—2 in FIG. 1 showing the circular cross-section of the crossed-over loop.

FIG. 3 is a view of the lure as it appears out of the water and wherein the crossed-over loop has a flat cross-section.

FIG. 4 is section 4—4 in FIG. 3 showing the flat cross-section of the crossed-over loop.

FIG. 5 is a view of a lure having the body and head portion of an earthworm and having two crossed-over loop appendages on opposite sides of the body.

FIG. 6 is a view of a stubby body resembling a small water frog having two crossed-over loop appendages on opposite sides to simulate the legs of the frog.

FIG. 7 is a view of a fishing lure spreader mounting apparatus containing one lure of a type such as that shown in FIG. 1 or FIG. 3 and another lure in the shape of a spoon.

DESCRIPTION OF THE PREFERRED EMBODIMENT

Referring now to the drawings, in which identical or similar parts are designated by the same numerals throughout, and referring first to FIG. 1 there is shown a fishing lure designated generally by the numeral 10 including a body portion 12, a head portion 14 at one extreme and a tail portion 16 at the other extreme. A hook 18 is passed through the head portion 14 such that the barb and point 20 are within the head thereby making the lure weedless. A line 22 is attached to the hook 18. In FIG. 1 the lure is shown as it appears in the water with the tail portion 16 extended slightly from its position when out of the water and in a position from which it directs the head and body movement. In FIG. 1 the tail portion 16 has a generally circular cross-section shown as section 2—2 in FIG. 2. This shape provides a slow rhythmic tail action which causes and directs the head portion 14 to rock back and forth from one side to the other as shown at numerals 24 in FIG. 1 when the lure is pulled slowly at a steady speed through the water. When the lure is alternately moved rapidly and then stopped the tail portion 16 extends as shown in FIG. 1 and then retracts to a rest position with the tail crossed over the body in the shape in which is was molded, as in FIG. 3. Very rapid jerking motion of the line 22 causes the head portion 14 to dart sharply in a direction forward but also to one side or the other. The tail portion 16 extends but does not spiral or cause the lure body 12 to rotate.

In FIG. 3 a fishing lure is shown in its position at rest, out of the water, where it assumes the shape in which it was molded. The tail portion 24 is of a flat cross section as shown in FIG. 4. Whereas the lure shown in FIG. 1 having a circular cross-section tail has a slow rhythmic tail action, the flat cross-section tail results in a rapid tail action which causes and directs the head portion 14 to rock slowly from side to side. The forces of the water cause the flat tail 24 to turn over first in one direction, for example clockwise when viewed from the head, then reverse to counter-clockwise in the opposite direction. This reversal of direction of the tail causes and directs the body portion 12 to shift to the opposite side, all of this action due to the fact that the tail when extended is in a condition of unstable fluctuation since its only stable position is that position in which it was molded, as illustrated in FIG 3.

In FIG. 5 a fishing lure is illustrated generally by the numeral 26 having a body portion 28 with a head portion 30 at one extreme and a tail portion 32 at the other extreme. Two crossed-over loop appendages 34 and 36 are attached on opposite sides of tail section 32. A hook 38 passes through the head portion 30 having its point and barb 40 embedded within the head 30 thereby making the lure weedless. The hook 38 is secured to a line 42. The two appendages 34 and 36 are caused to oscillate, extend and retract when acted upon by the forces of the water resulting in total body action of a type having no twisting forces at the connection to the line 42 due to the equal and opposite actions of the two oppositely crossed-over loops of the appendages 34 and 36.

In FIG. 6 a fishing lure is illustrated generally by the numeral 44 having a solid rotund body 46 and a hook 48 passing through the body with the barb and point 50 embedded within the body. The hook 48 is attached to line 52. Two crossed-over loop appendages 54 and 56 are attached to the body 46 at opposite sides thereof. These appendages oscillate, extend and retract when under the forces of the water. No twisting occurs at line 52 due to the opposite nature of the crossed-over loops of the two appendages. The fishing lure of FIG. 6 resembles the common water frog.

In FIG. 7 a fishing lure spreader mounting apparatus is shown wherein the spreader 58 is connected to fishing line 60. Attached to one side of the spreader 58 is a swivel 62, and attached to the swivel a spoon 64. At the other side of the spreader 58 is a swivel 66 and attached to this swivel a fishing lure shown generally by the numeral 68. The lure 68 may be of the type shown in FIG. 1 and FIG. 3 or any similar type fishing lure. Even with the use of the usual swivel attachments certain fishing lures can twist causing problems at the reel when the line is retrieved. The mounting apparatus shown in FIG. 7 has zero torque at the line 60 because of the equal and opposite torques of the spoon 64 and lure 68.

The crossed-over loop in the tail, as shown in FIGS. 1 and 3, and in the appendages shown in FIGS. 5 and 6 result in a total body action which is particularly attractive to game fish causing them to strike at the lure as it moves through the water.

The fishing lures and the mounting apparatus illustrated and described in detail in this specification, in accordance with the Patent Statutes, is the preferred embodiment. It is understood that the invention is not limited thereto, since it will be apparent to one skilled in the art that a number of modifications, variations, and other alternatives are possible. Accordingly, the invention should be considered to include all variations and alterations falling within the scope of the appended claims.

What I claim is:

1. In an artificial fishing lure having a solid, flexible, and elongate body of elastomeric material having a head at one end thereof for receiving a fishhook in embedded relation therein, a tail of greater length extending rearwardly from said head, and wherein said lure at rest has a preformed curvilinear configuration to permit yielding flexure thereof in the water to attract fish, the improvement therein comprising:

said predetermined curvilinear configuration defining a single loop of said body with said tail extending in a continuous arcuate path rearwardly from said head to define a transverse intersection crossing said body at a point adjacent the fishhook engagement with said head, the portion of said head extending forwardly of said intersection having a dimension substantially comparable to the terminal portion of said tail extending transversely past said intersection, to define a substantially symmetrical contour, thereby to provide substantially total balanced flexing movement of the entire length of the lure as the same is drawn through the water.

2. The improved lure of claim 1 wherein said body is of substantially circular cross-section.

3. The improved lure of claim 1 wherein said body adjacent said head is of substantially circular cross-section and said tail is of substantially flat cross-section.

4. The improved lure of claim 1 wherein the greater portion of the length of the lure extends along said loop with lesser portions of said lure constituting the forward head portion and the terminal tail portion.

* * * * *